Jan. 8, 1952      J. V. LAPIK      2,581,337
OIL FILTER
Filed Jan. 10, 1948
*Fig. 1.*
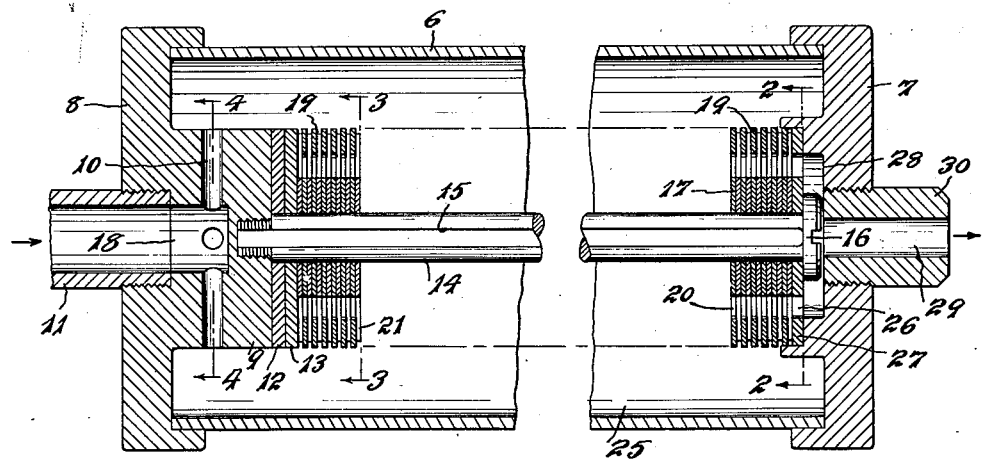
*Fig. 4.*      *Fig. 3.*      *Fig. 2.*
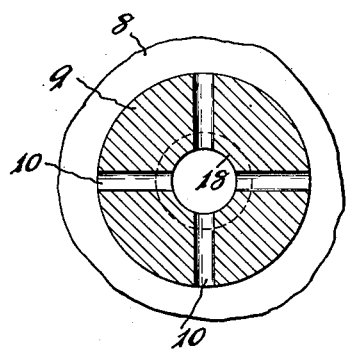 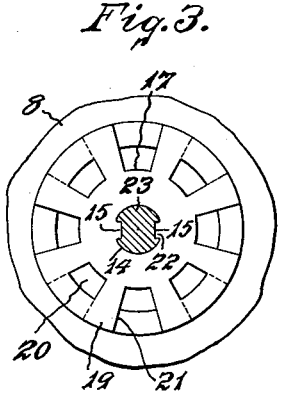 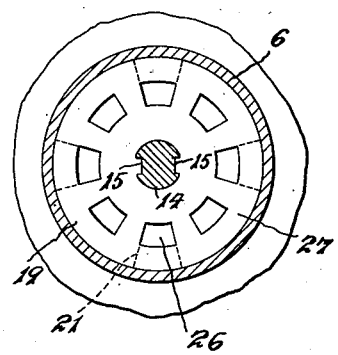
*Fig. 5.*
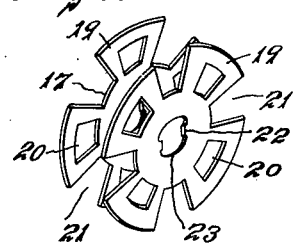
INVENTOR.
JOHN V. LAPIK.
BY
*Louis V. Lucia*
ATTORNEY.

Patented Jan. 8, 1952

2,581,337

UNITED STATES PATENT OFFICE 2,581,337

OIL FILTER

John V. Lapik, New York, N. Y.

Application January 10, 1948, Serial No. 1,591

3 Claims. (Cl. 210—164)

This invention relates to the class of filters commonly employed for filtering the oil used in connection with engines frequently of the internal combustion type, and an object of my invention, among others, is the production of a filter for use for this purpose that is simple in construction and particularly efficient in the results obtained by its operation.

One form of a filter embodying the invention and in the construction and use of which the objects herein set out, as well as others, may be attained is illustrated in the accompanying drawings, in which Fig. 1 is a view in central lengthwise section through my improved filter with parts broken away and some parts omitted to more clearly show the construction.

Fig. 2 is a view in cross section on a plane denoted by the broken line 2—2 of Fig. 1.

Fig. 3 is a similar view on a plane denoted by the broken line 3—3 of Fig. 1.

Fig. 4 is a like view on a plane denoted by the broken line 4—4 of Fig. 1.

Fig. 5 is an isometric view illustrating two of the filter disks.

In the accompanying drawings the numeral 6 denotes a shell or casing composed of metal or other suitable material and preferably of cylindrical form with covers 7—8 secured to its opposite ends in any suitable manner, as herein shown screw threaded engagement being employed for the purpose. The cover 8, which is secured to the intake end of the shell, has a hub 9 preferably integral therewith with passages 10 extending radially from an inlet recess 18 in the center of the hub as shown in Fig. 1 of the drawings. A tube 11 is secured to this cover as a means for introduction of the oil into said recess and eventually into the casing 6. A packing disk 12 of suitable packing material is placed against the end of the hub 9 and an end disk 13 is placed against the packing disk.

A filter disk support 14, preferably in the form of a rod, is screw threadedly secured to the hub 9 as a support for the stack which is formed from a plurality of filter disks, this rod having a groove or grooves 15 forming keyways extending lengthwise thereof, as shown in Fig. 1, the end of the rod 14 opposite the hub 9 having a slotted head 16 to provide for turning the rod to engage its opposite end with said hub. Filter disks 17 are mounted on said rod in staggered relation, as shown in Figs. 2, 3 and 5. Each of these disks is of star shape comprising wings 19 with openings 20 therein and with notches 21 between the wings.

Each of the disks has a key or keys 22 in a central opening 23 therein which engages in the groove or grooves 15 to hold the disks against rotative movement when arranged on the support 14; the said key or keys on adjacent disks being spaced 45° to permit the staggered positioning of the disks on the support 14. When secured in place on said support the openings 20 in each disk are located opposite a notch 21 in each of the disks on opposite sides thereof, as illustrated in Figs. 2, 3 and 5, so that continuous passages are formed extending lengthwise of the filter.

In the operation of the filter, the chamber 25, within the shell 6 and between the wall thereof and the peripheral edges of the disks, is filled with the oil to be filtered, which is delivered into the case under some pressure. This oil moves in the direction indicated by the arrows in Fig. 1 whereby it enters the chamber 25 through the tube 11 and the radial passages 10 The oil then passes from said chamber into the spaces between the disks and through the passages created by the openings 20 and notches 21, flowing along said passages that open through holes 26 in an end plate 27 which is supported in a recess in the cover 7 and against which the series of filtering disks rest. Through the holes 26 the filtered oil enters a chamber 28 in the cover 7 and then flows out through a passage 29 in an outlet nipple 30 secured in a screw threaded opening in the cover 7. The sludge extracted from the oil remains in the space 25 within the shell and from which it may be removed by displacing the head 7.

It will be noted that the end plate 27 has a snug slide bit along the surrounding wall of the recess on the hub of the cover 7. This provides a tolerance for any variations which may occur in the length of the stack of filter disks and thereby permit proper assembly of the said cover relatively to the casing 6.

I claim:

1. An oil filter including a casing, a cover secured to each end of said casing to form a chamber therein, an integral hub on one of said covers extending inwardly into the said chamber and having an inlet chamber therein communicating with the chamber in the casing through radial passages in the said hub, a supporting rod threaded to the said hub and extending axially of the casing, a plurality of filter disks stacked upon said rod, an end plate on said rod at the end of the stack of said disks, a head on said rod engaging the said end plate for urging the disks against the said hub and into close relation for filtering oil passing between them; the said disks providing a series of longitudinal passages extending parallel to said rod, access to said passages being provided between every other of said disks to thereby cause a filtering of oil passing between the disks and through the longitudinal passages, and means for supporting the said disks at the end opposite the said hub including a hub on the other of said covers extending into the casing and having a recess therein snugly and slidably receiving the said end plate, a chamber opening into said recess and communicating with said passages through openings in said end plate, and an outlet from the chamber through which the filtered oil passes.

2. An oil filter including a casing of tubular form, opposed end covers secured to the opposite ends of said casing to form a chamber therein, each of said covers having an integral inwardly extending axial hub portion, the hub portion of one of said covers having therein an inlet chamber and radial passages communicating the said inlet chamber with the interior of the casing, a supporting bar extending along the axis of the casing and rigidly secured at one end to said hub with the radial passages, a series of disks secured upon said rod in close relation for filtering oil passing between them, the said disks being arranged so as to provide a plurality of passages extending longitudinally of said support and spaced equi-distant from the center thereof, there being access to said passages between every other of said disks thereby providing a filtering action for oil passing between the said disks and through the said longitudinal passages, the hub of the other of said covers being provided with a recess, and an end plate at one end of said series of disks having openings therein in register with the said longitudinal passages to thereby provide an outlet for the filtered oil; the said end plate fitting within said recess to support said disks co-axially with said casing.

3. An oil filter as set forth in claim 2 including a packing disk between the end of the said series of filtering disks and the axial hub to which the supporting rod for said filtering disks is secured.

JOHN V. LAPIK.

REFERENCES CITED

The following references are of record in the file of this patent:

UNITED STATES PATENTS

| Number | Name | Date |
| --- | --- | --- |
| 1,335,899 | Kahlenberg | Apr. 6, 1920 |
| 1,648,773 | Lundborg | Nov. 8, 1927 |
| 2,118,295 | Crawford et al. | May 24, 1938 |
| 2,283,629 | Heftler | May 19, 1942 |
| 2,339,814 | Pond et al. | Nov. 27, 1945 |

FOREIGN PATENTS

| Number | Country | Date |
| --- | --- | --- |
| 107,090 | Great Britain | June 21, 1917 |